US 6,744,912 B2

(12) United States Patent
Colbeth et al.

(10) Patent No.: US 6,744,912 B2
(45) Date of Patent: Jun. 1, 2004

(54) MULTIPLE MODE DIGITAL X-RAY IMAGING SYSTEM

(75) Inventors: Richard E. Colbeth, Los Altos, CA (US); John M. Pavkovich, Palo Alto, CA (US); Edward J. Seppi, Portola Valley, CA (US); Edward G. Shapiro, Mountain View, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 156 days.

(21) Appl. No.: 10/167,092

(22) Filed: Jun. 10, 2002

(65) Prior Publication Data

US 2002/0191828 A1 Dec. 19, 2002

Related U.S. Application Data

(62) Division of application No. 09/309,725, filed on May 11, 1999, now Pat. No. 6,424,750.
(60) Provisional application No. 60/056,926, filed on Nov. 29, 1996.

(51) Int. Cl.⁷ .............................. G06T 5/00; H05G 1/64
(52) U.S. Cl. ........................ 382/132; 382/275; 348/246; 378/98.8
(58) Field of Search ................................. 382/254, 275, 382/132; 348/246, 247; 358/482; 250/208.1; 378/4, 98, 98.8, 207; 600/425

(56) References Cited

U.S. PATENT DOCUMENTS

| 4,672,454 A | 6/1987 | Cannella et al. |
| 5,170,115 A | 12/1992 | Kashiwabara et al. |
| 5,184,018 A | 2/1993 | Conrads et al. |
| 5,262,649 A | 11/1993 | Antonuk et al. |
| 5,465,284 A | 11/1995 | Karellas |
| 5,506,880 A | 4/1996 | Scardino et al. |
| 5,657,400 A | 8/1997 | Granfors et al. |
| 5,801,571 A | 9/1998 | Allen et al. |

(List continued on next page.)

FOREIGN PATENT DOCUMENTS

EP  A-0 776 124  5/1997

OTHER PUBLICATIONS

Shiebel et al., "Fluoroscopic X–Ray Imaging with Amorphous Silicon Thin–Film Arrays," SPIE vol. 2163, Physics of Medical Imaging, 1994, pp 129–140.
Fujied et al, "Two Operation Modes of 2D a–Si Sensor Arrays for Radiating Imaging," Journal of Non–Crystalline Solids 173 & 138, 1991, pp. 1321–1324.
Boyer et al., "A Review of Electronic Portal Imaging Devices (EPIDS)," Med. Phys. 19(1) Jan./Feb. 1992, pp. 1–16.

*Primary Examiner*—Scott Rogers
(74) *Attorney, Agent, or Firm*—Vedder, Price, Kaufman & Kammholz, P.C.

(57) ABSTRACT

A multiple mode digital X-ray imaging system providing for preprocessing "binning" of analog pixel signals from a detector array by selectively summing, within the detector array, adjacent pixel charges on a row-by-row basis and selectively summing, within detector array readout circuits, the previously summed pixel charges (by rows) on a column-by-column basis. An array, or mapping, of "defective pixel" flags is used to identify defective pixels within the detector array, with such flags being added to, or inserted into, the incoming data stream for dynamic processing along with the incoming pixel data. A buffer and filter is used to perform still image capture during the radiographic mode of operation and to recursively filter incoming data frames during the fluoroscopic mode of operation by summing a scaled amount of pixel data from prior data frames with a scaled amount of incoming pixel data from the present data frame.

9 Claims, 14 Drawing Sheets

U.S. PATENT DOCUMENTS

| | | |
|---|---|---|
| 5,864,146 A | 1/1999 | Karellas |
| 5,872,470 A | 2/1999 | Mallinson et al. |
| 5,970,115 A | 10/1999 | Colbeth et al. |
| 5,995,675 A * | 11/1999 | Hwang ....................... 348/246 |
| 6,084,461 A | 7/2000 | Colbeth et al. |
| 6,424,750 B1 | 7/2002 | Colbeth et al. |
| 6,529,618 B1 * | 3/2003 | Ohara et al. ................. 382/132 |
| 6,618,084 B1 * | 9/2003 | Rambaldi et al. ........... 348/247 |
| 6,661,456 B1 * | 12/2003 | Aufrichtig et al. .......... 348/247 |
| 2001/0036305 A1 * | 11/2001 | Jun ............................. 382/149 |
| 2001/0038706 A1 * | 11/2001 | Eck et al. .................... 382/132 |
| 2003/0007081 A1 * | 1/2003 | Kwon et al. ................. 348/247 |

* cited by examiner

MULTIPLE MODE DIGITAL X-RAY IMAGING SYSTEM

RELATED APPLICATIONS

This application claims the benefit of U.S. Provisional Application No. 60/056,926 which was converted to provisional status from U.S. Non-Provisional application Ser. No. 08/753,799, which was filed on Nov. 29, 1996, and entitled "Multiple Mode Digital X-Ray Imaging System", and is a divisional application from Ser. No. 09/309,725, filed May 11, 1999 now U.S. Pat. No. 6,424,750.

BACKGROUND OF THE INVENTION

The present invention relates to radiation imaging systems, and in particular, to solid state X-ray radiation imaging systems capable of operating in multiple detection and display modes.

DESCRIPTION OF THE RELATED ART

The use of X-ray radiation has become a valuable and widespread tool in medical diagnoses and treatments. In film radiography, a burst of X-rays, after passing through the body, is recorded on high resolution X-ray film. In fluoroscopy, an image intensifier tube converts X-ray radiation to a video signal for viewing and recording interior body activity as a video image.

Film radiography is commonly used due to its good spatial resolution, high signal-to-noise ratio (SNR), large detection area and low cost. However, developing exposed X-ray film typically takes a minimum of ninety seconds which can be too long in emergency situations. Further, the relatively low dynamic range of X-ray film can result in under- or over-exposed images and, therefore, necessitate additional exposures which increase the aforementioned time delay as well as the X-ray dosage received by the patient The image intensifier tube used in fluoroscopy has a greater exposure latitude than X-ray film, but also has a more limited active detection area and lower spatial resolution. The lower spatial resolution associated with the total active area is somewhat mitigated in that the image intensifier tubes allow magnification of the central image portion, thereby providing a means to enhance visual details. However, the image intensifier tube is typically heavy, bulky and expensive, and can introduce image distortion which can only be partially removed during post processing.

A number of alternative X-ray imaging technologies have been developed. For example, one alternative, known as computed radiography, involves the use of a photostimulable phosphor plate which has the same physical appearance as a standard X-ray film cassette and provides good spatial resolution, SNR and dynamic range. However, after exposure to X-rays, the photostimulable phosphor plate must be scanned with a laser system which is large and expensive, and the readout process is just as slow as the development of film.

Another alternative which provides good spatial resolution and dynamic range, as well as the added advantage of compatibility with real time digital image processing techniques, involves the use of solid state detector panels. One such panel uses an amorphous silicon (a-Si) detector array arranged as a two dimensional matrix of pixels, each of which consists of a photosensitive element and a transistor switch. As with X-ray film cassettes, the detector array is covered with a scintillation layer to convert impinging X-rays into visible light for the photosensitive elements.

SUMMARY OF THE INVENTION

An X-ray imaging system in accordance with the present invention is capable of operating in multiple imaging modes, such as radiographic and fluoroscopic, while providing spatial resolutions, SNRs and dynamic ranges which can be selectively optimized to the selected mode of operation.

In accordance with one aspect of the present invention, the combining of pixel information collected by the detector array, i.e., "pixel binning," is performed by selectively combining one portion of the pixel information within the detector array and selectively combining the remainder of the pixel information within the circuits fed by the output of the detector array. Such pixel binning is preferably analog in nature and is performed prior to any digitizing of the pixel signals, thereby providing for a higher SNR, and, importantly, reducing the bandwidth requirements for the digital electronics. More specifically, a multiple mode X-ray detector system for supporting multiple X-ray image display modes by providing X-ray image signals having selectable spatial resolutions includes a detector array and a group of detector array receiver circuits. The detector array is configured to receive a group of detector control signals and in accordance therewith receive and convert X-ray photons corresponding to a two-dimensional image into a first group of image signals representing a first two-dimensional array which includes a first group of rows and a first group of columns of pixels which together correspond to the two-dimensional image and which individually correspond to respective portions of the two-dimensional image. The detector array provides, in accordance with the detector control signals, a second group of image signals representing a second two-dimensional array which includes a second group of rows and the first group of columns of super pixels which selectively represent respective individual ones or multiple adjacent ones of the first group of rows of pixels and respective individual ones of the first group of columns of pixels, respectively. The detector array receiver circuits, coupled to the detector array, are configured to receive a group of receiver control signals and in accordance therewith receive and combine the second group of image signals and in accordance therewith provide a third plurality of image signals representing a third two-dimensional array which includes the second group of rows and a second group of columns of super pixels which selectively represent respective individual ones of the second group of rows of super pixels and respective individual ones or multiple adjacent ones of the first group of columns of super pixels, respectively.

In accordance with another aspect of the present invention, data flags are used to identify defective pixels within the detector array and are inserted into the data stream collected from the detector array for dynamic processing along with the pixel data. More specifically, a data processing system for processing a serial stream of multiple bit data sets which represent an array of pixels corresponding to a two-dimensional image including correcting for defective pixels individually or in groups includes a data processing circuit and a data selection circuit. The data processing circuit is configured to receive and process together a plurality of successive sets of image data with a corresponding plurality of successive sets of correction data and in accordance therewith provide a plurality of successive sets of corrected image data. The plurality of successive sets of image data represents a plurality of pixels corresponding to a two-dimensional image, the plurality of successive sets of correction data represents a plurality of correction factors, each one of the plurality of correction factors corresponds to a respective one of the plurality of pixels and each one of the plurality of successive sets of correction data includes a data subset which indicates whether the respective one of the plurality of pixels is defective. The data selection circuit, coupled to the data processing circuit, is configured to receive and select between individual ones of the plurality of successive sets of corrected image data and individual ones of the corresponding plurality of successive sets of correction data and in accordance therewith provide a plurality of successive sets of selected data. An individual one of the plurality of successive sets of selected data includes a corresponding individual one of the plurality of successive sets of correction data when the data subset indicates that the corresponding respective one of the plurality of pixels is defective, and the individual one of the plurality of successive sets of selected data includes a corresponding one of the plurality of successive sets of corrected image data when the data subset does not indicate that the corresponding respective one of the plurality of pixels is defective.

In accordance with still another aspect of the present invention, a data buffer and filter is used to perform still image capture during radiographic imaging and to recursively filter incoming image data during fluoroscopic imaging. More specifically, a digital data buffer and filter for selectively storing image pixel data, combining new incoming image pixel data with previously stored image pixel data and providing such combined image pixel data for display thereof in a still image mode or an image motion mode includes a data scaling and summing circuit and a data memory circuit. The data scaling and summing circuit is configured to receive and scale an input data signal, receive and scale a stored data sum signal and sum said scaled input data signal and said scaled stored data sum signal and in accordance therewith provide a data sum signal. The input data signal is scaled in accordance with a first scaling factor and the stored data sum signal is scaled in accordance with a second scaling factor. The input data signal includes a plurality of successive sets of image data, and each one of the plurality of successive sets of image data includes a plurality of pixel data with active and inactive data states and which corresponds to a two-dimensional image having a two-dimensional array including a plurality of rows and a plurality of columns of pixels which together correspond to the two-dimensional image and which individually correspond to respective portions of the two-dimensional image. The data memory circuit, coupled to the data scaling and summing circuit, is configured to receive and selectively store the data sum signal and provide the stored data sum signal. The data scaling and summing circuit and the data memory circuit cooperatively operate in one of a plurality of operational modes during reception of the plurality of successive sets of image data. In a first one of the plurality of operational modes (e.g., in fluoroscopic mode), the first scaling factor has a value which is between zero and unity, and the second scaling factor has a value which equals a difference between unity and the first scaling factor value. In a second one of the plurality of operational modes (e.g., in radiographic mode): the first scaling factor has a value which is initially unity when a first one of the plurality of successive sets of image data is in the inactive data state, remains unity when a subsequent second one of the plurality of successive sets of image data is in the active data state and becomes zero when a further subsequent third one of the plurality of successive sets of image data is in the inactive data state; and the second scaling factor has a value which is initially zero, becomes unity when the subsequent second one of the plurality of successive sets of image data is in the active data state and remains unity thereafter.

These and other features and advantages of the present invention will be understood upon consideration of the following detailed description of the invention and the accompanying drawings.

DETAILED DESCRIPTION OF THE INVENTION

Figure 1:
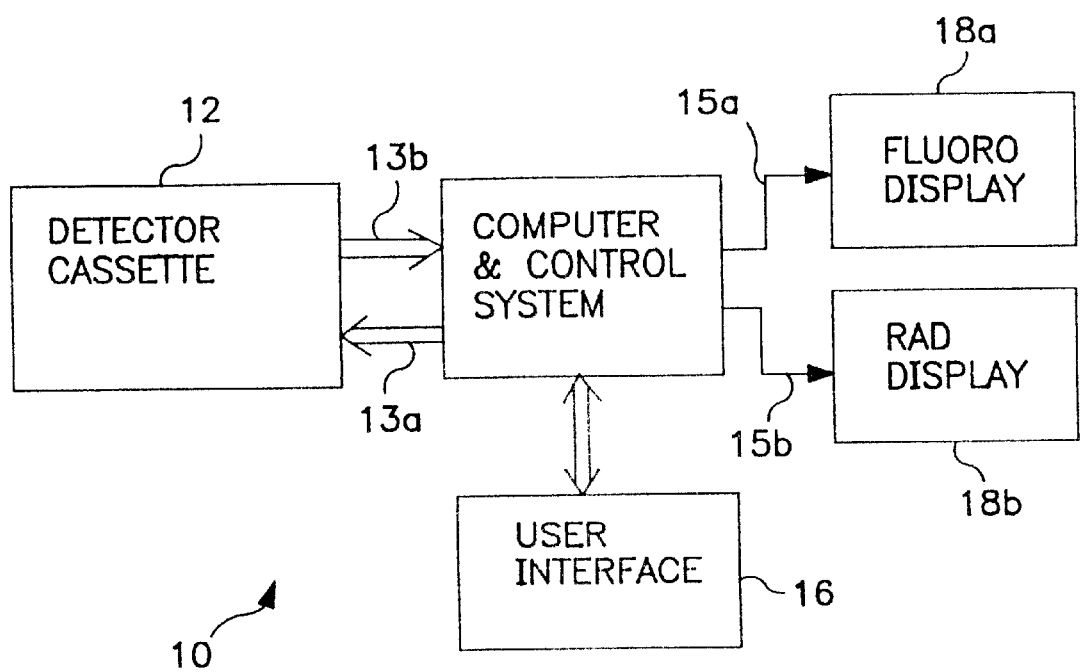
FIG. 1 is a functional block diagram of an X-ray imaging system in accordance with the present invention.

Referring to FIG. 1, an X-ray imaging system 10 in accordance with the present invention includes a detector cassette 12, a computer and control system 14, a user interface 16, a fluoroscopic display 18a and a radiographic display 18b, interconnected substantially as shown. A user controls the system 10 by way of a user interface 16 (e.g., graphical user interface display, keyboard, mouse, etc.) which communicates with the computer and control system 14. Accordingly, the computer and control system 14 generates control signals 13a for the detector cassette 12 which provides image data signals 13b in return. (As desired, one display monitor could be used to selectively display both fluoroscopic and, radiographic images, as well as the graphical user interface display image, e.g., all images could be displayed simultaneously in a "windowed" format, or either a fluoroscopic image or a radiographic image could be displayed along with a pull down menu bar, which menu bar constitutes the graphical user interface providing for selection of fluoroscopic or radiographic imaging.)

Following processing of such image data, the computer and control system 14 provides fluoroscopic image data 15a or radiographic image data 15b for display on a fluoroscopic display 18a or a radiographic display 18b, respectively, depending upon the selected mode of operation. The fluoroscopic display 18a preferably employs a phosphor which has a relatively short persistence time, thereby reducing unwanted ghost images when observing motion in the sequence of displayed images. The radiographic display 18b preferably employs a phosphor which yields a bluish tint to gray levels and has a relatively long persistence time, thereby replicating the bluish tint typically found in standard medical X-ray film images and reducing unwanted flicker in the displayed image.

Figure 2:
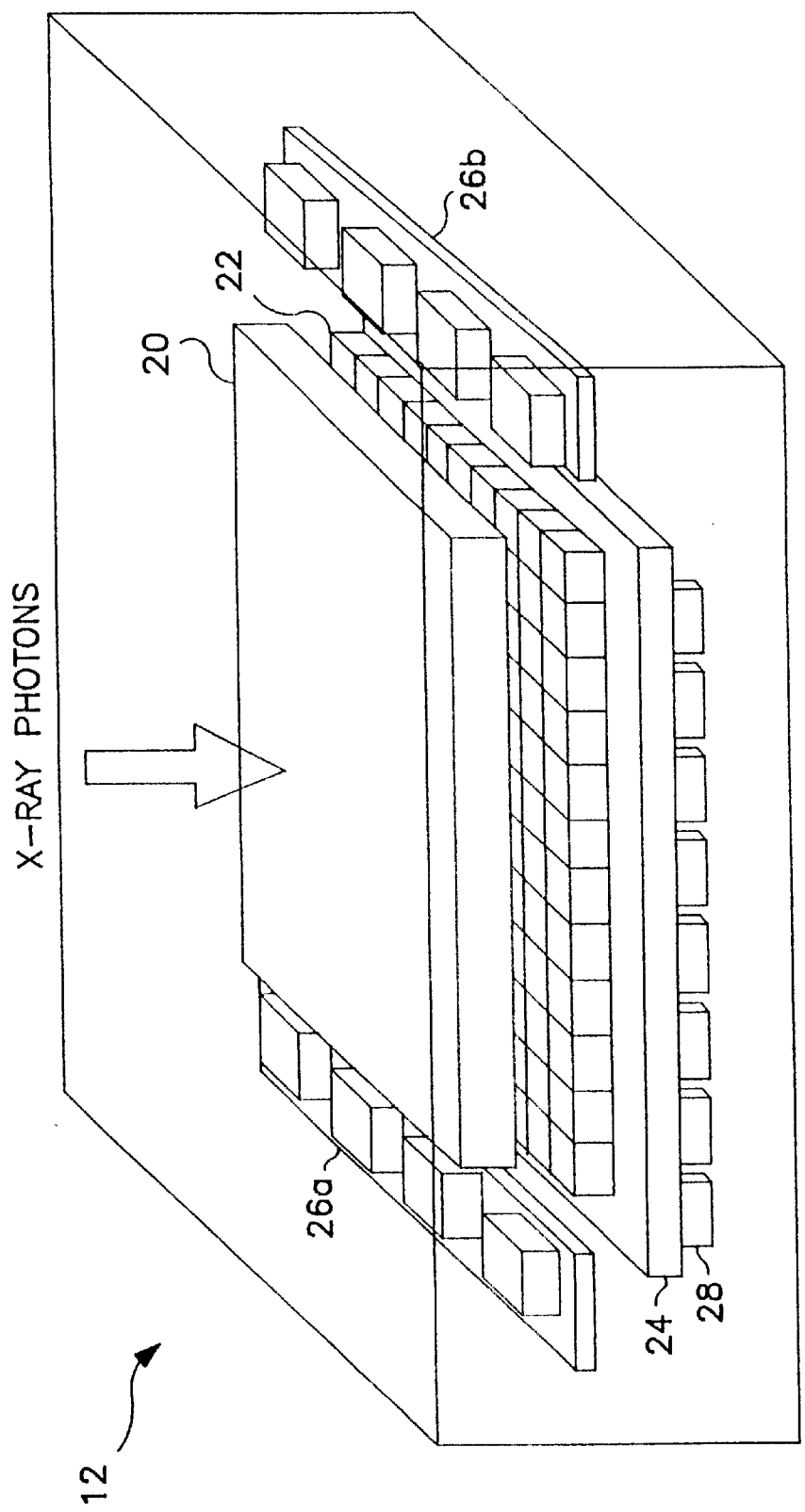
FIG. 2 is an exploded perspective view of an X-ray detector cassette for an X-ray imaging system in accordance with the present invention.

Referring to FIG. 2, the detector cassette 12 is similar in external appearance to the typical cassette which contains standard medical X-ray film and is, therefore, highly mobile and easy to use as required for a radiographic mode of operation. A scintillation layer 20, e.g., of cesium iodide (CsI), absorbs and converts impinging X-ray photons to visible light photons for detection by photosensitive elements within the detector array 22, e.g., of amorphous silicon (a-Si). The thickness of the scintillation layer 20 is selected so as to absorb sufficient X-ray photons and produce sufficient visible photons so as to generate an adequate SNR for fluoroscopic operation. Similarly, the columns, or "needles," of the crystalline CsI are selected so as to have diameters sufficiently small to support the spatial resolution sampling desired for radiographic operation.

The detector array 22 is designed in accordance with well known techniques into a two dimensional array of microscopic squares referred to as picture elements, or "pixels." Each pixel is composed of an addressable photosensitive element, such as a photodiode and switching transistor combination. As discussed in more detail below, each pixel is accessed in accordance with drive signals from off-array driver circuit assemblies 26a, 26b which provide addressing control signals. In accordance with well known techniques, the lateral dimensions of the photodiodes are made sufficiently small to provide the desired spatial resolution imaging for radiographic operation and the capacitance of the photodiodes is designed to be sufficiently large to provide the desired signal handling capacity for accommodating the largest signal produced during radiographic operation.

The pixel data accessed by the driver circuits 26 are read out by a receiver, or readout, circuit assembly 28, as discussed in more detail below. The receiver circuit assembly 28 and detector array 22 are mounted on opposing sides of a base plate 24. (The receiver circuit assembly 28 is placed beneath the array 22 so as to minimize the lateral size of the detector cassette 12 and thereby make the detector cassette 12 approximately the same size as a film cassette. If so desired, the driver circuits 26 can also be placed beneath the array 22.)

Figure 3:
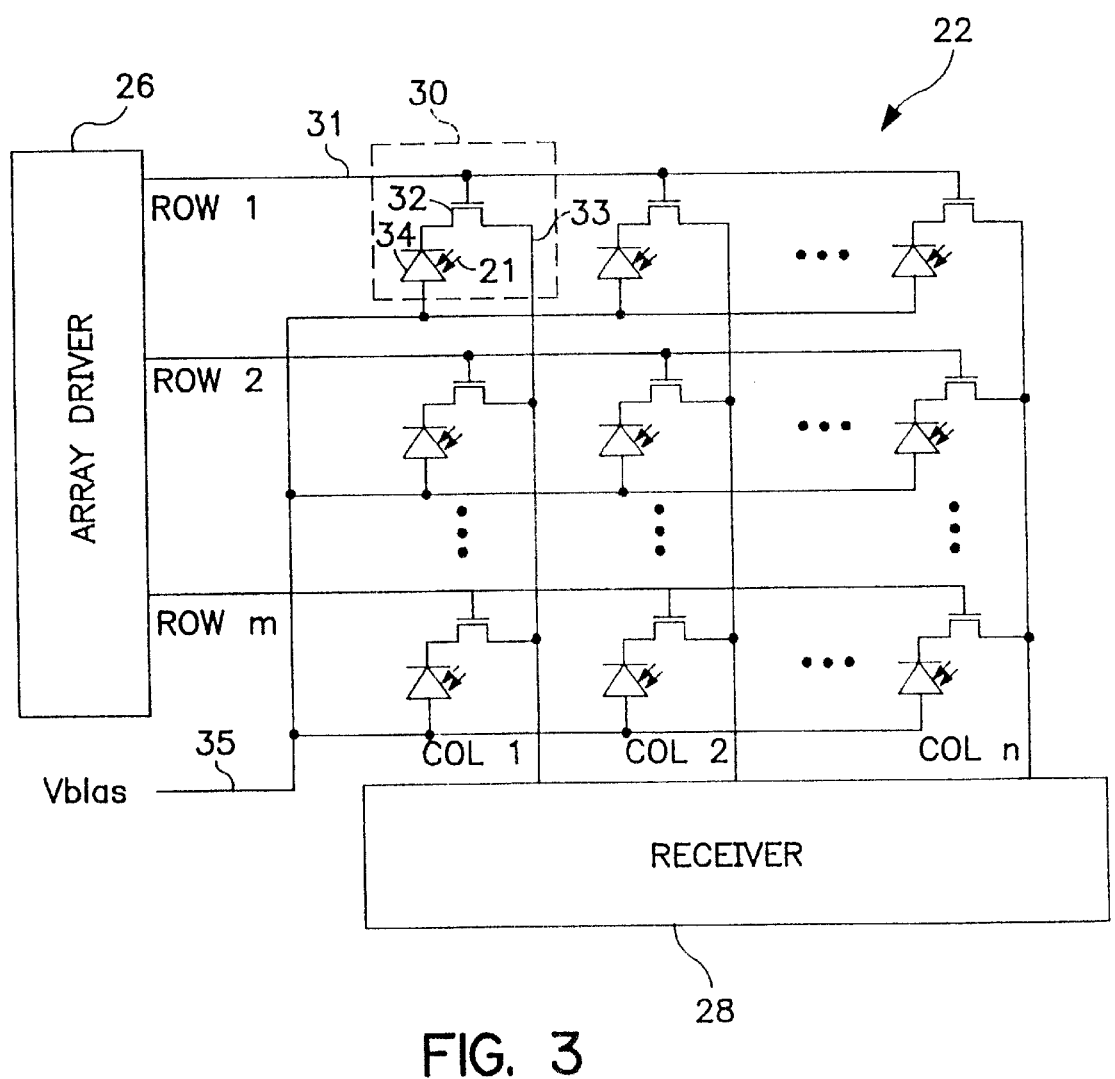
FIG. 3 is a schematic diagram of a portion of the detector array of FIG. 2.

Referring to FIG. 3, the detector array 22, as noted above, is composed of a two dimensional array, or matrix, of photosensitive pixels 30 which, in a preferred embodiment, include a switching transistor 32 and a photodiode 34. The anode of the photodiode 34 is biased by a biasing voltage 35 to establish a capacitance for storing electrical charges which accumulate due to the reception of incident light 21 from the scintillation layer 20 (FIG. 2). When the pixel 30 is accessed, a row address signal 31 from the array driver circuit 26 (discussed in more detail below) drives the gate of the switching transistor 32 (TFT), thereby providing a column data signal 33 representing the stored charge from the photodiode 34. This signal 33 is received and buffered by a charge sensitive amplifier within the receiver circuit assembly 28 (discussed in more detail below).

Each row address signal 31 is asserted for a predetermined period of time, referred to as "line time." During assertion of each row address signal 31, the signal 33 from each pixel along that row is transmitted via the column data lines to the receiver circuit assembly 28 where the signal 33 on each data line is received and buffered by a corresponding charge sensitive amplifier (discussed in more detail below). Hence, an entire row of image data is captured in one line time period. With each subsequent line time period, a subsequent row of image data is captured. At the end of a "frame time" period, the entire image has been captured. In this manner, each pixel contained in the entire active detection area is sampled individually.

Based upon the foregoing, and in accordance with the more detailed discussions of the driver 26 and receiver 28 circuit assemblies which follow, it can be seen that the pixel array supports multiple modes of operation. For example, during radiographic operation, the pixel data is sampled on a pixel-by-pixel basis as discussed above. However, during fluoroscopic operation, pixel data access can be accelerated, albeit with a reduction in spatial resolution. This can be done by combining, or "binning," multiple pixels to produce "super pixels." For example, a two-by-two pixel subset in which two rows and columns of pixels are combined can be created by addressing two adjacent rows and two adjacent columns of pixels at one time, with the driver circuit assembly 26 performing the simultaneous row addressing and the receiver circuit assembly 28 performing the column line signal combining. Hence, while the spatial resolution is reduced accordingly, significantly less time will be required to capture the image, thereby allowing fluoroscopic imaging to be performed.

This use of super pixels can also be done in a more selective manner. For example, image acquisition in a fluoroscopic magnification mode can be performed when only a portion of the active detection area is of interest. During such operation, the rows outside the region of interest are addressed at a rapid rate or skipped entirely, while the rows within the region of interest are addressed at a slower rate. The overall time to sequence through or skip past all of the rows, i.e., the frame time, can remain equal to the frame time associated with the fluoroscopic normal mode. However, due to the increased time available within the region of interest, the super pixels within such region can be reduced in size, thereby increasing the spatial resolution. (Appropriate combining of column line signals is also used accordingly.) Hence, the smaller the size of the super pixel in the region of interest, the higher the apparent magnification. (A smaller area of the detector is captured when operating in fluoroscopic magnification mode than when operating in fluoroscopic normal mode, but the display area remains the same, thereby producing an apparent magnification.)

Figure 4:
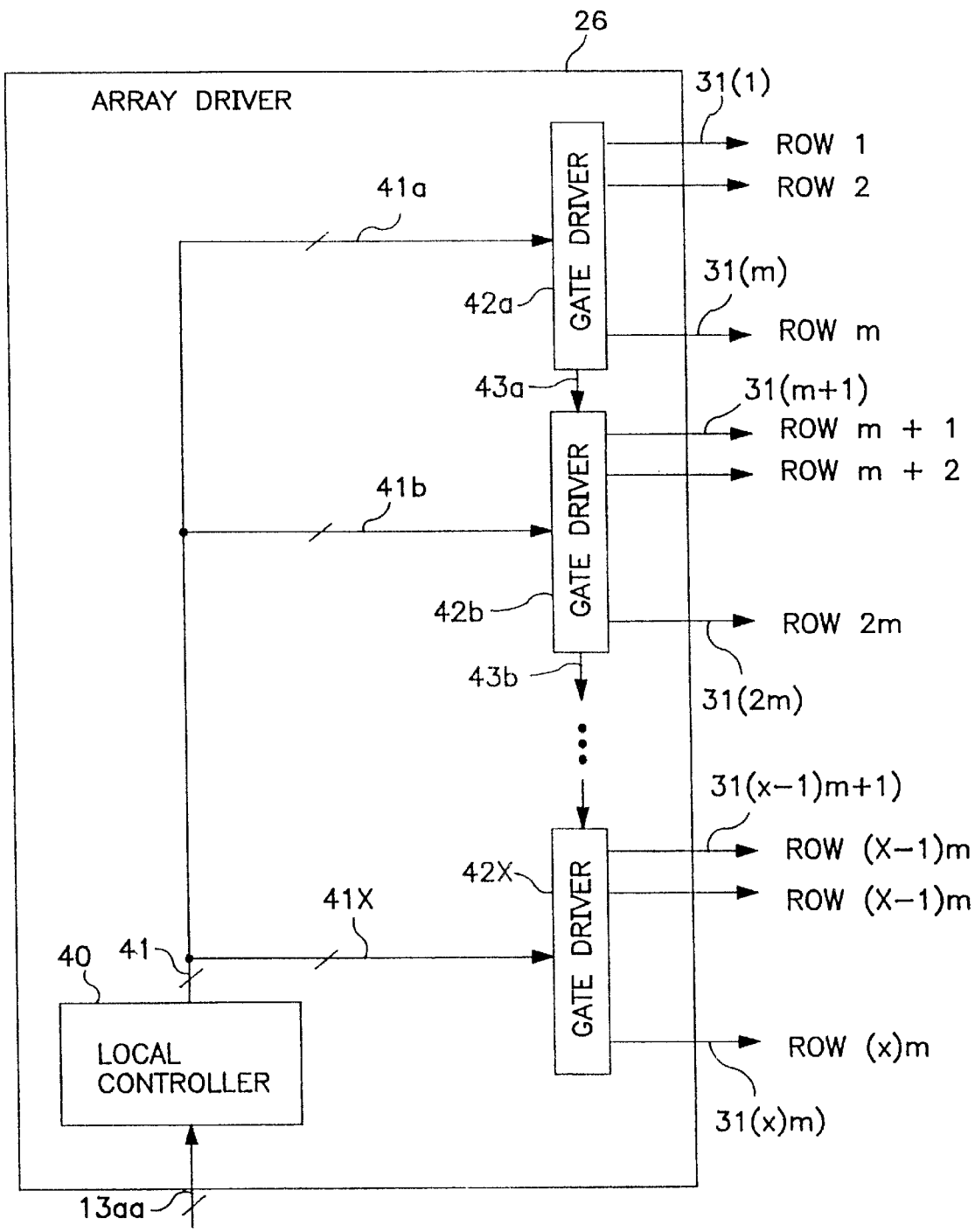
FIG. 4 is a functional block diagram of the array driver circuit assemblies of FIG. 2.

Referring to FIG. 4, the driver circuit assembly 26 includes a local controller 40 for receiving control signals 13aa from the computer and control system 14 (FIG. 1), plus a series of gate drivers 42 for providing the row addressing signals 31. These gate drivers 42 can be operated in the manner of shift registers or, alternatively, be individually programmed as desired according to the mode of operation using the control signals 41 from the local controller 40. For example, during radiographic operation, the driver circuits 42 can be programmed such that the row 1 addressing signal 31(1) is asserted while the remaining row addressing signals are de-asserted. Immediately following the next line synchronization cycle, the row 1 signal is de-asserted and the row 2 signal is asserted, while the remaining row signals are de-asserted. This successive assertion and de-assertion of signals is repeated until all rows have been addressed. During fluoroscopic operation, the foregoing assertion and de-assertion sequence is repeated, with the exception that multiple adjacent row address signals are asserted at one time for creating super pixels, as discussed above.

Figure 5:
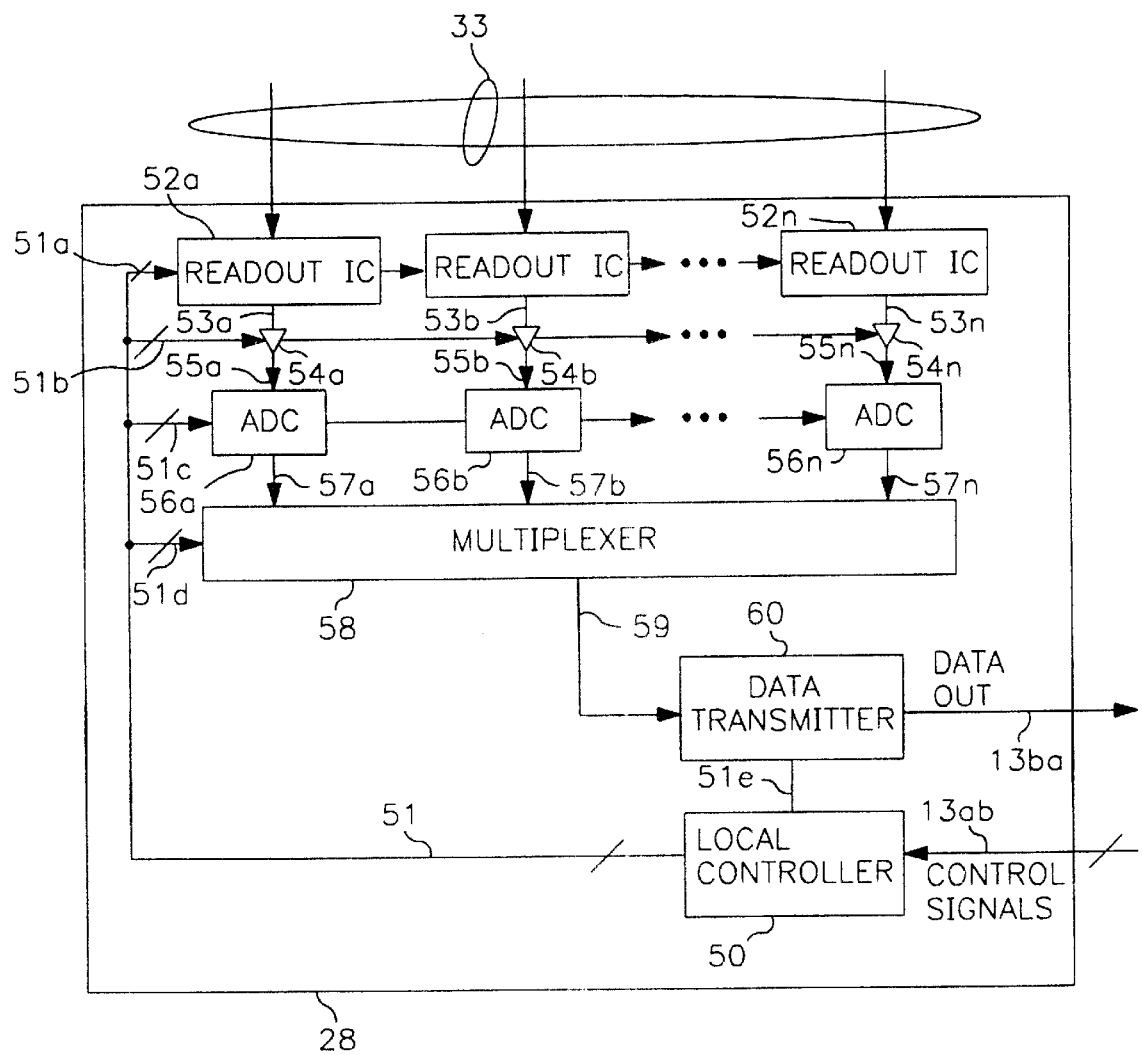
FIG. 5 is a functional block diagram of the receiver circuit assembly of FIG. 2.

Referring to FIG. 5, the receiver circuit assembly 28 includes a local controller 50 for receiving control signals 13ab from the computer and control system 14 (FIG. 1) and generating local control signals 51. In accordance with its local control signals 51a, a number of readout circuits 52 (discussed in more detail below), the number of which depends upon the number of columns to be read out from the detector array 22, receives the column data signals 33. The outputs 53 from the readout circuits 52 are buffered by respective transimpedance amplifiers 54. These transimpedance amplifiers 54 are controlled by local control signals 51b for purposes of controlling their offset and gain characteristics (discussed in more detail below). The buffered column data signals 55 are converted by analog-to-digital converters (ADCs) 56. The resulting digitized column data signals 57 are then multiplexed by a multiplexor. The resulting multiplexed data signals 59 are buffered by a data transmitter 60 for transmission to the computer and control system 14.

The control signals 51b for the transimpedance amplifiers 54 are used to selectively optimize the offset and gain characteristics of the amplifiers 54. This allows the amplifiers 54 to be biased to match the respective output signal ranges of the amplifiers 54 to the input signal ranges of the corresponding ADCs 56.

Figure 6:
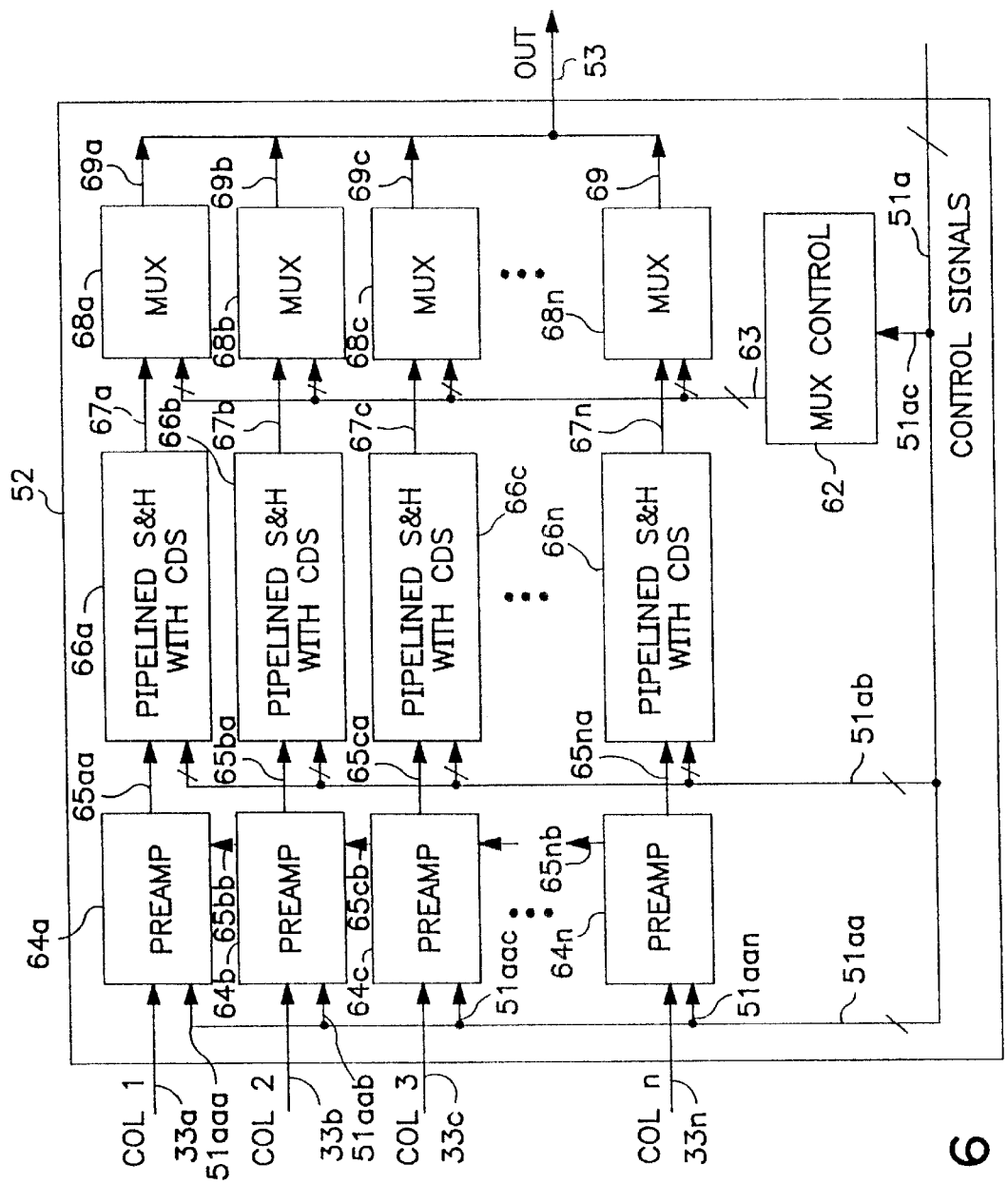
FIG. 6 is a functional block diagram of the readout circuits in the receiver circuit assembly of FIG. 5.

Referring to FIG. 6, the readout circuits 52 collectively include multiple input preamplifiers 64, pipelined sample and hold circuits 66 and output multiplexors 68, interconnected substantially as shown. The control signals 51a from the local controller 50 (FIG. 5) control the preamplifiers 64, pipelined sample and hold circuits 66 and a multiplexor controller 62 which, in turn, controls the multiplexors 68 via multiplexor control signals 63. The preamplifiers 64 receive the column data signals 33 with charge sensitive amplifiers and provide the aforementioned binning capability for creating super pixels (in conjunction with the multiple row addressing capability of the array driver circuit 26 (FIG. 4) as discussed above). The charge sensitive amplifiers are discussed in more detail in copending, commonly assigned U.S. patent application Ser. No. 08/758,538, entitled "Charge Sensitive Amplifier With High Common Mode Signal Rejection," filed Nov. 29, 1996, the disclosure of which is incorporated herein by reference. The pixel binning capability provided by the preamplifiers is discussed in more detail below in connection with FIG. 7.)

The buffered output signals 65aa, 65ba, 65ca, from the preamplifiers 64, are sampled using correlated double sampling by the pipelined sample and hold circuits 66 in accordance with their respective control signals 51ab. These pipelined sample and hold circuits 66 are described in more detail in copending, commonly assigned U.S. patent application Ser. No. 08/758,536, entitled "Pipelined Sample and Hold Circuit With Correlated Double Sampling," filed Nov. 29, 1996, the disclosure of which is incorporated herein by reference.

The sampled data signals 67 are multiplexed by their respective multiplexors 68 to provide the final output signal 53. These multiplexors 68 operate in an analog current mode and are described in more detail in copending, commonly assigned U.S. patent application Ser. No. 08/758,528, entitled "Current Mode Analog Signal Multiplexor," Nov. 29, 1996, the disclosure of which is incorporated herein by reference.

Figure 7:
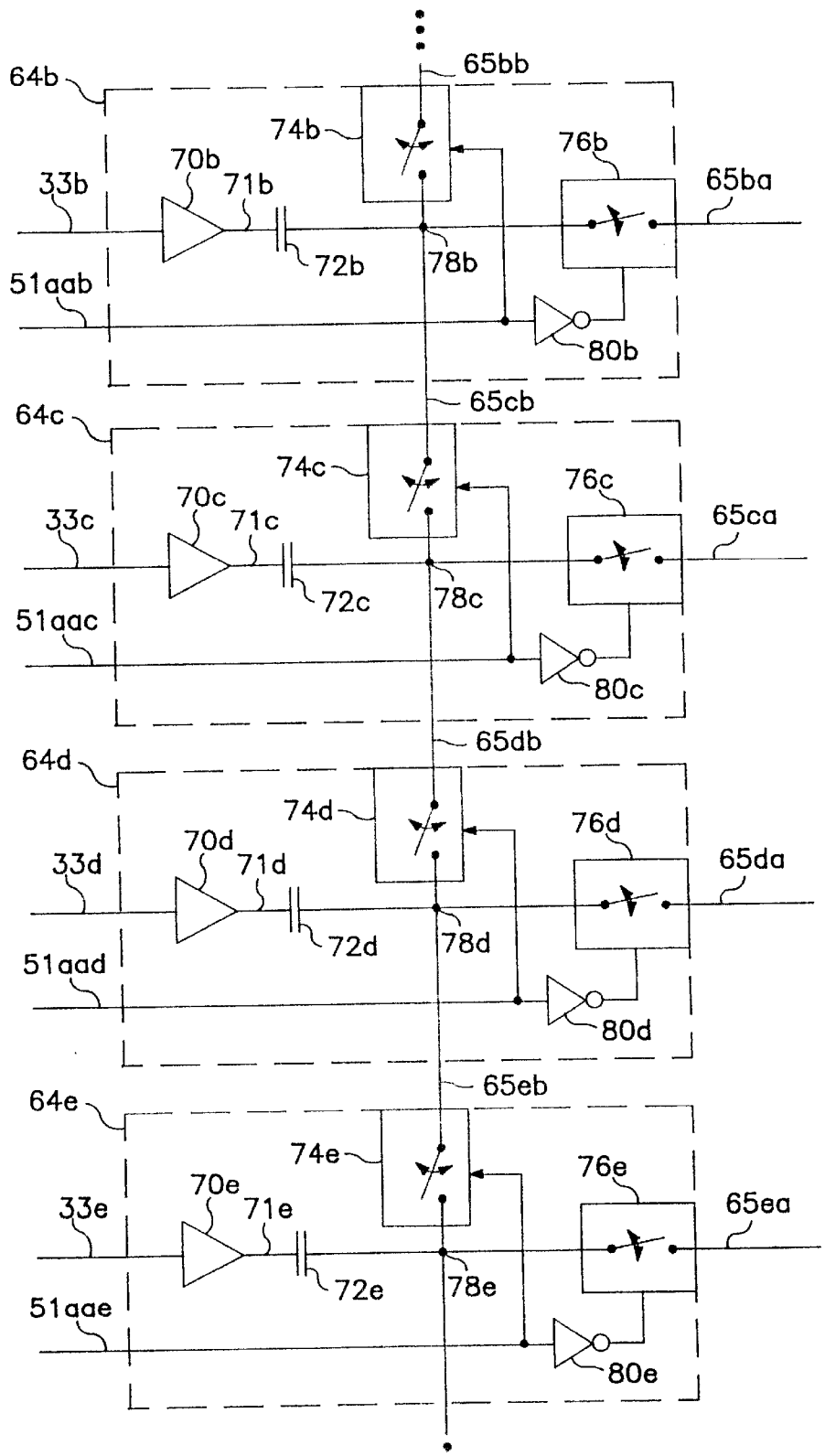
FIG. 7 is a simplified schematic diagram of several adjacent preamplifier circuits in the readout circuit of FIG. 6.

Referring to FIG. 7, the aforementioned pixel binning capability with respect to the column data can be described as follows. For purposes of this explanation, the second 64b, third 64c and fourth 64d preamplifier circuits are illustrated to represent the interconnection among adjacent preamplifiers 64. Internal to each preamplifier 64 is the aforementioned charge sensitive amplifier 70 which receives the column data signal 33. The buffered column data signal 71 is coupled by a series coupling capacitor 72 to a summing node 78 for selectively being summed with the buffered and capacitively coupled column data signal from its adjacent preamplifier circuit 64. For example, if one-by-two super pixels were being used, then the third and fourth pixels would be binned together by appropriately asserting and de-asserting the control signals in signal sets 51aac and 51aad (and their inverse equivalents via inverters 80c and 80d) so that switches 74c, 74e and 76d are opened and switches 74d and 76c are closed. Accordingly, the buffered and capacitively coupled data signal 65db from the fourth preamplifier 64d is summed with that of the third preamplifier 64c at its summing mode 78c for outputting as binned pixel data signal 65ca.

Figure 8:
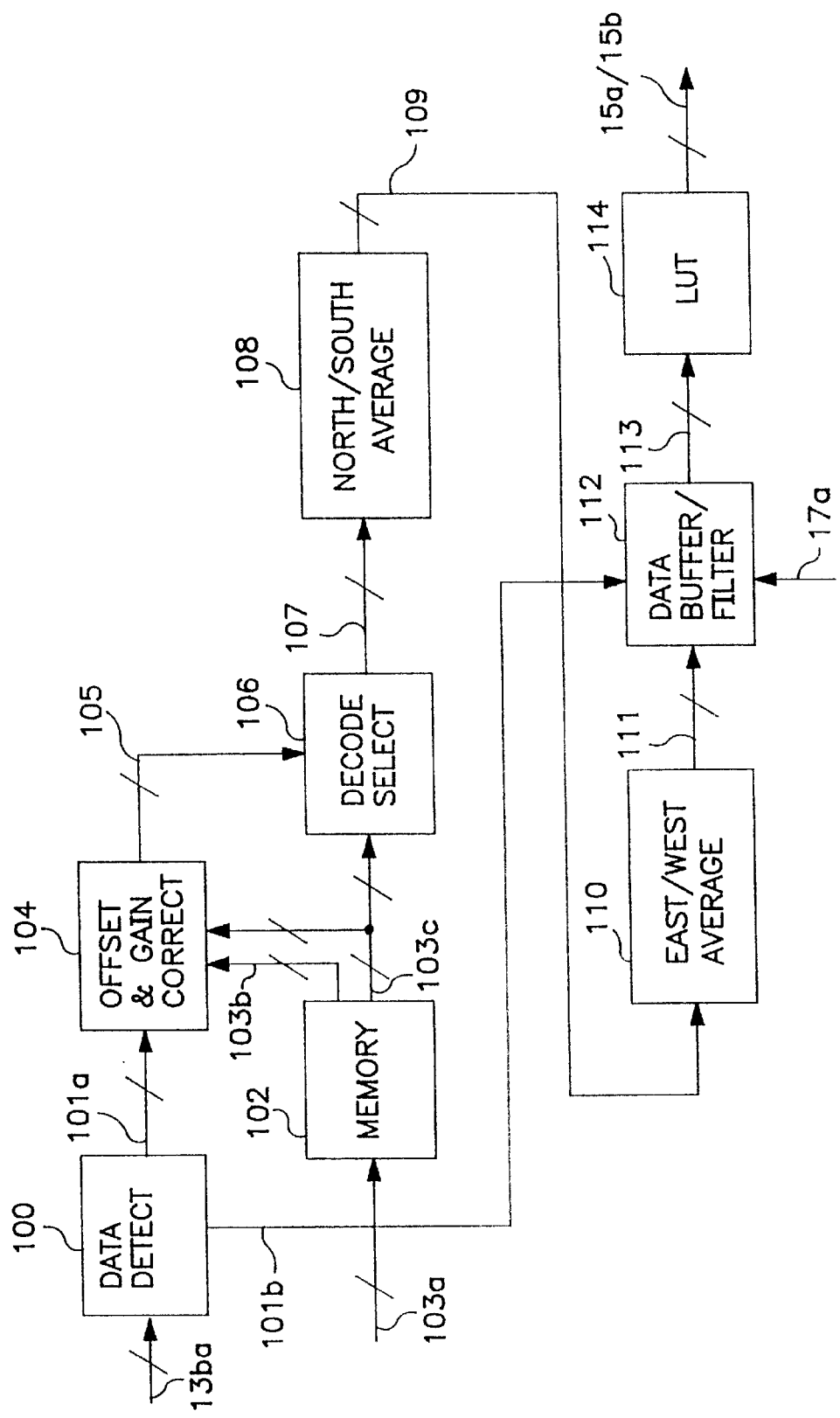
FIG. 8 is a functional block diagram of the portion of the computer and control system of FIG. 1 in which the image data is processed for display in accordance with the selected mode of operation.

Referring to FIG. 8, that portion 14a of the computer and control system 14 (FIG. 1) responsible for processing the image data for display in accordance with the selected mode of operation functions as follows. The sampled image data 13ba from the detector cassette 12 (FIG. 1) is detected by a data detection stage 100. The data detection stage 100 monitors selected portions of the frame of incoming data and, in addition to passing the incoming data 101a on to the next stage, generates a data present status signal 101b for use elsewhere within the system (as discussed in more detail below).

The buffered sampled image data 101a is corrected by an offset and gain correction stage 104 using offset and gain correction data 103b, 103c stored in a memory 102. Such offset and gain correction data 103b, 103c can be acquired in accordance with well known techniques. For example, the offset correction data, used to correct for the effects of leakage currents within the detector array 22 (FIG. 2), can be collected by processing dark frames of pixel data (no X-ray photons received) and inputted as a portion of pixel mapped data 103a to the memory 102. The gain correction data, used for normalizing the gain profile of the detector array 22, can be collected by processing frames of pixel data generated when receiving an unobstructed X-ray field, and inputted as a portion of pixel mapped data 103a to the memory 102. Such data is used to correct for variations in pixel quantum efficiency and the two dimensional gain profile of the detector array 22 together with its associated receiver circuitry 28.

In addition to the offset and gain information, one of the correction data words 103c (e.g., corresponding to that normally used for gain correction data) also includes pixel flag data and pixel data averaging instruction bits which identify, on a pixel-by-pixel basis, which pixels, if any, are defective and the nature of such defect and, therefore, require the use of either north/south or east/west averaging. Such pixel flag data can be collected in accordance with well known techniques. For example, defective pixels can be identified while collecting the offset and/or gain correction data.

Figure 9:
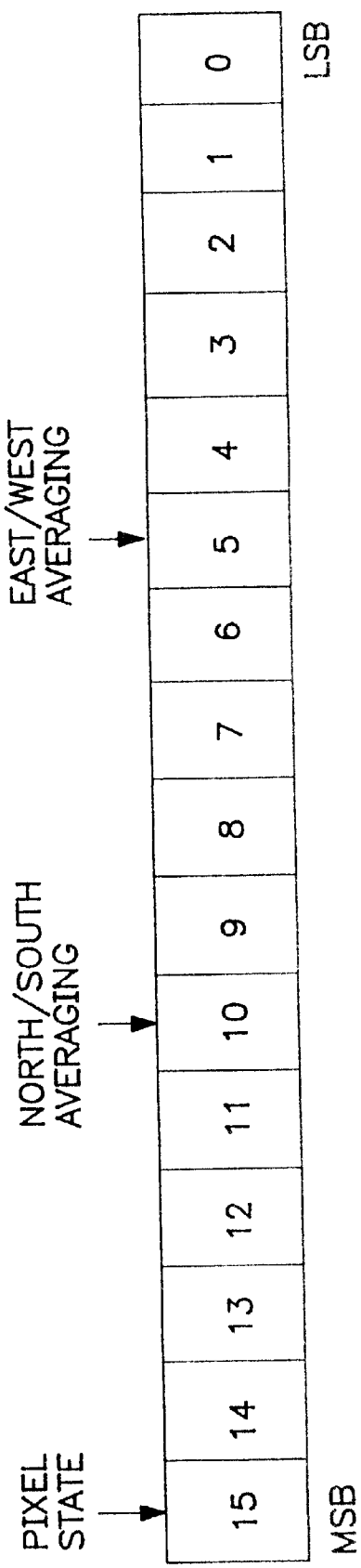
FIG. 9 represents the format of the data correction instruction word used by the decode/select and pixel data averaging stages of FIG. 8.

Referring to FIG. 9, the format of the correction data word 103c corresponding to a bad pixel is as shown. (It should be understood that other selected bits within the word 103c can be used, as desired). The most significant bit is used to identify the state of the pixel, i.e., whether the pixel represents valid data or is defective and, therefore, represents invalid data. Other bits, e.g., bits 10 and 5, are used to indicate whether north/south or east/west averaging is to be performed. When the pixel data flag identifies the pixel as containing valid data, the remaining bits contain the actual offset or gain correction information to be used by the offset and gain correction stage 104.

Figure 10:
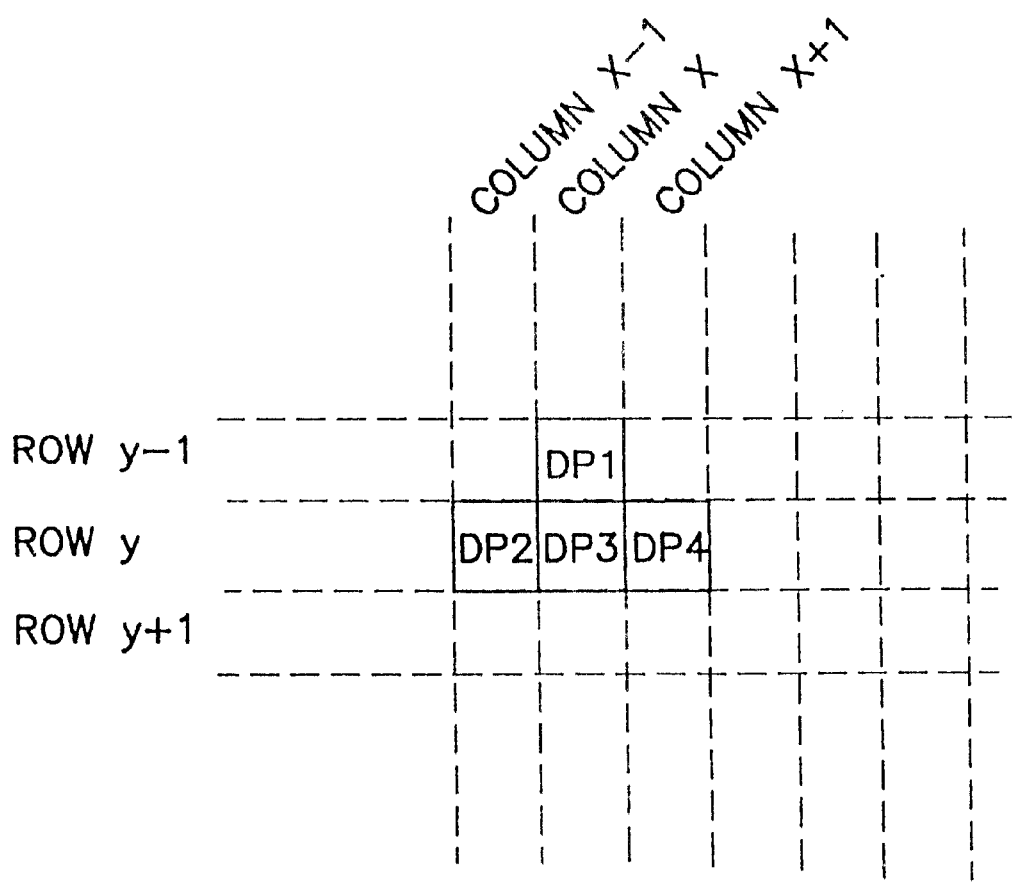
FIG. 10 illustrates an example of how the grouping of defective pixels within the detector array determines the selection of north/south or east/west pixel data averaging.

Referring to FIG. 10, the decision criteria for determining whether north/south or east/west pixel data averaging is to be performed can be explained as follows. In this example, a group of four defective pixels DP1–DP4 have been identified in columns X−1 through X+1 and rows Y−1 and Y, as shown. For this configuration of defective pixels, the data correction words 103c corresponding to these defective pixels, in addition to containing asserted pixel flags identifying these pixels as being defective, will contain asserted north/south and east/west averaging instruction bits. For defective pixels DP2 and DP4, a north/south averaging will be performed using the pixel data immediately above and below in columns X−1 and X+1. Since this portion of columns X−1 and X+1 contain "good" pixel data, the defective pixels DP1 and DP3 will be processed using east/west averaging. It is preferred that an east/west average be followed by a north/south and thereafter followed by a second east/west average to allow different arrangements of defective pixels to be corrected.

Referring again to FIG. 8, the offset and gain correction stage 104 processes the incoming data 101a on a pixel-by-pixel basis in accordance with the correction data 103b, 103c regardless of whether any such data is identified as originating from a bad pixel. The resulting corrected data 105 is then provided, along with the one correction data word 103c to a decode/select circuit 106. If, according to the pixel flag data within the correction data word 103c from the memory 102, the corrected pixel data 105 did not originate from a defective pixel, the decode/select circuit 106 provides the corrected pixel data 105 as its output signal 107. If, however, the pixel flag data identify the "corrected data" 105 as having originated from a defective pixel, the decode/select circuit 106 provides the correction data 103c from the memory 102 as its output signal 107 for dynamic processing along with other valid corrected pixel data by the remainder of this processing section 14a.

The data 107 from the decode/select stage 106 is then processed, in accordance with the north/south and east/west averaging instruction bits discussed above, by a north/south averaging circuit 108 or an east/west averaging circuit 110. For example, if the selected data 107 contains an instruction bit identifying north/south averaging as being required, the north/south averaging stage 108 produces appropriately averaged data 109 which is then simply passed through the east/west averaging stage 110 without further processing. However, if the selected data 107 contains an instruction bit identifying east/west averaging as being required, the selected data 107 is simply passed through the north/south averaging stage 108 and presented to the east/west averaging stage 110 for appropriate processing therein.

Figure 11:
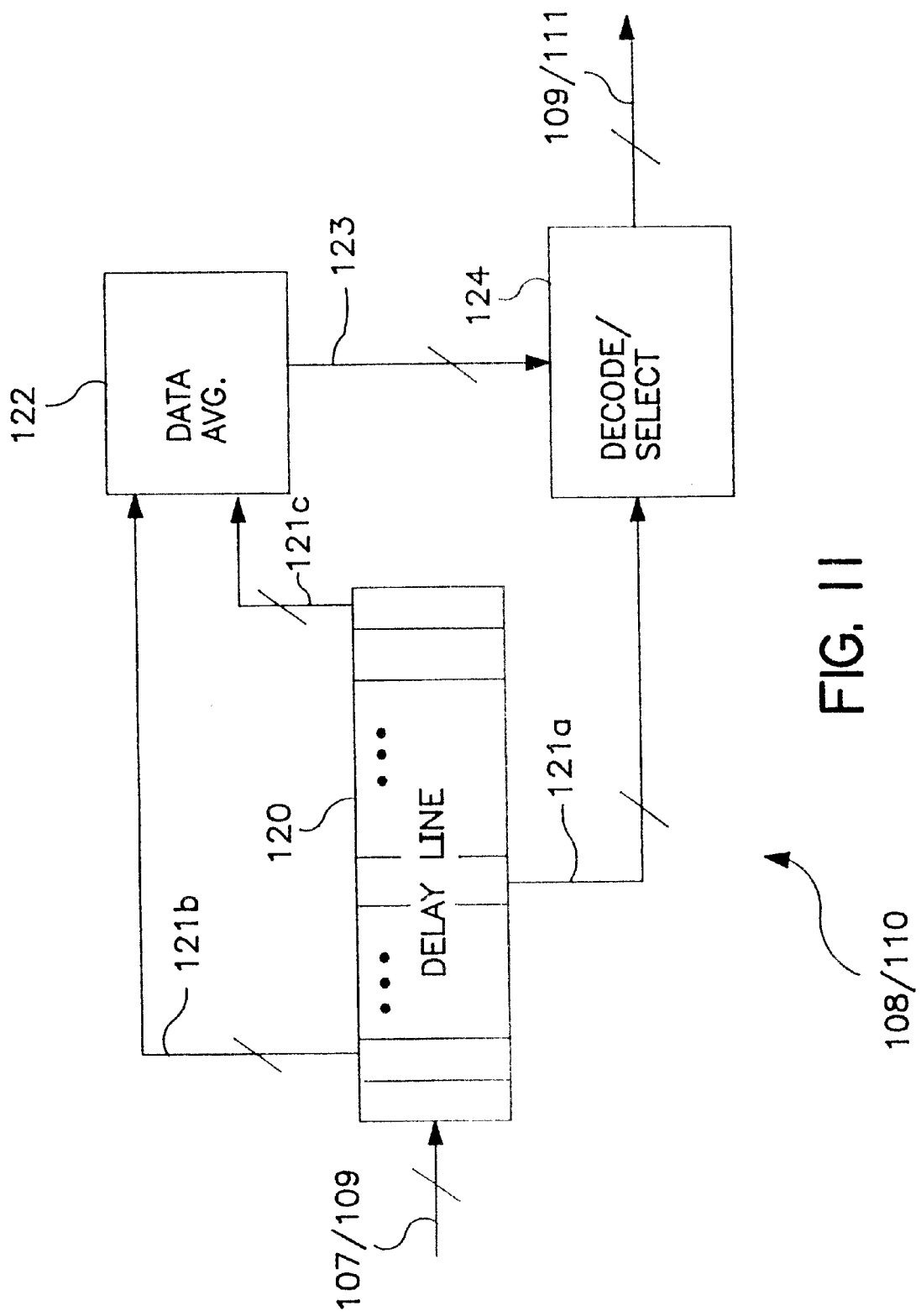
FIG. 11 is a functional block diagram of the pixel data averaging stages of FIG. 8.

Referring to FIG. 11, the averaging function performed by the north/south 108 and east/west 110 averaging stages can be described as follows. The incoming data 107/109 is inputted continuously to a delay line 120 (e.g., a shift register). For the north/south averaging stage 108, this delay line 120 is large enough to contain slightly more than two rows of pixel data, while for the east/west averaging stage 110, the delay line 120 need only be large enough to accommodate three or more pixels worth of data. When a data word 107/109 containing an asserted averaging instruction bit which corresponds to that particular averaging stage 108/110 is encountered, it is provided as an output signal 121a to a decode/select stage 124 when it has reached the approximate midpoint of the delay line 120.

Upon receiving this signal 121a, the decode/select stage 124, recognizing the instruction, uses the averaged pixel data 123 provided by a data averaging stage 122. (The data averaging operation performed by this stage 122 can be done in accordance with any of several well known techniques, e.g., interpolation of selected adjacent pixel data.) If, however, this midpoint signal 121a from the delay line 120 does not contain an asserted averaging instruction bit, but, instead, simply contains normal pixel data, the decode/select stage 124 will ignore the averaged pixel data 123 constantly being provided by the data averaging stage 122 and simply provide this pixel data signal 121a as its output data signal 109/111.

Referring again to FIG. 8, the final averaged pixel data 111 is then selectively processed by a data buffer/filter 112. The operation of this data buffer filter 112 for the different modes of operation can be explained as follows with reference to FIGS. 12 and 13. A preferred embodiment 112a of the data buffer/filter 112 includes an adder 130, a memory (e.g., random access memory) 132, two scaling circuits (e.g., multipliers) 134, 136, and two data registers 138, 140. The memory 132 is used to continuously receive and store the output data 113 on a frame-by-frame basis and provide such stored data in a first-in, first-out manner to one of the scaling circuits 136. The data registers 138, 140 contain data corresponding to scaling factors $_\alpha$ and $_\beta$ scaling the present pixel data 111 and corresponding prior pixel data 133 (i.e., from a previous frame), respectively. The data registers 138, 140 use the aforementioned data present status signal 101b, a mode control signal 17a (originating from within the computer and control system 14) and an $_{\alpha/\beta}$ programming signal 149 for establishing the values of the $_\alpha$ 139 and $_\beta$ 141 data provided to the scaling circuits 134, 136. The mode control signal 17a identifies whether a still or motion image operation is to be performed, while the $_{\alpha/\beta}$ programming signal 149 can be used to program the actual values for $_\alpha$ and $_\beta$.

Figure 13:
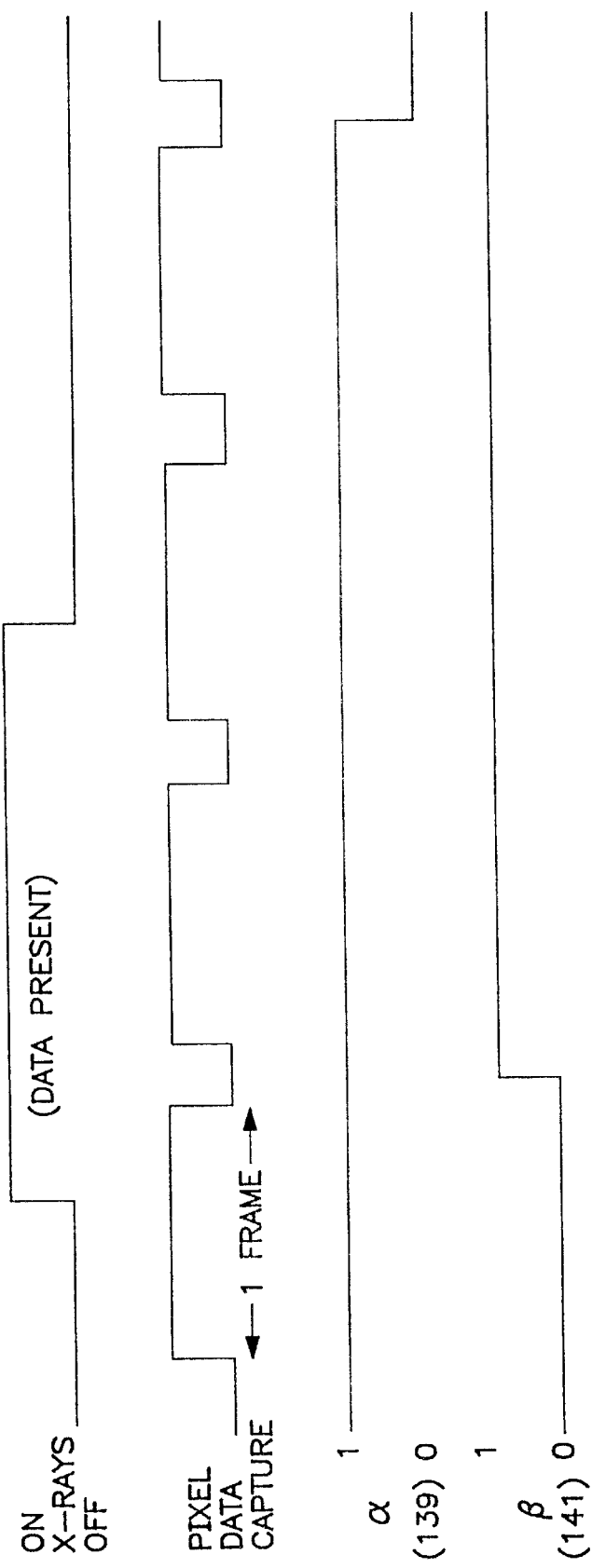
FIG. 13 is a timing diagram illustrating the relative timing and values of the data scaling factors during a radiographic mode of operation.

When operating in a still image (e.g., radiographic) mode, the $_\alpha$ data 139 and $_\beta$ data 141 are initialized at unity and zero, respectively. When the data present status signal 101b indicates that valid active data has begun being received, the $_\beta$ data 141 is switched from zero to unity. Accordingly, scaled data sets 135 and 137 are equal to the present frame pixel data 111 and prior frame pixel data 133, respectively, thereby resulting in frame summation. This summation of prior and present frames of pixel data is done to generate the complete data set for display and is necessary since all data associated with a still image is generally not captured in a single reading of one frame of data, as represented in FIG. 13. Once the data present status signal 101b has indicated that valid active data is no longer being received, and after one additional frame of data has been collected, the $_\alpha$ data 138 is reset to zero, while the $_\beta$ data 141 remains at unity.

When operating in a motion image (e.g., fluoroscopic) mode, the present data frame scaling factor $_\alpha$ 137 is set equal to a predetermined value between zero and unity. Such a value can be established empirically to provide a video display with the desired characteristics. The prior data frame scaling factor $_\beta$ 141 is set at a value which is also between zero and unity and is equal to 1−$_\alpha$. Hence, the output data 113 to be used for display purposes is composed primarily of the present frame of pixel data summed with a small portion of the prior frame of pixel data as stored by the memory 132. This has the effect of slightly increasing the SNR of the displayed frame as compared to the frame as captured by the detector array 22. (Also, it has the additional effect of smoothing out any observable motion within the displayed image).

Referring again to FIG. 8, the buffered and/or filtered pixel data 113 is used to address a lookup table 114 for purposes of mapping the input pixel data 113 to pixel data 15a/15b which is appropriately scaled for the particular display device being used. Alternatively, this output stage 114 can include additional circuitry, as desired, to provide actual video signals for directly driving a display monitor.

Figure 12:
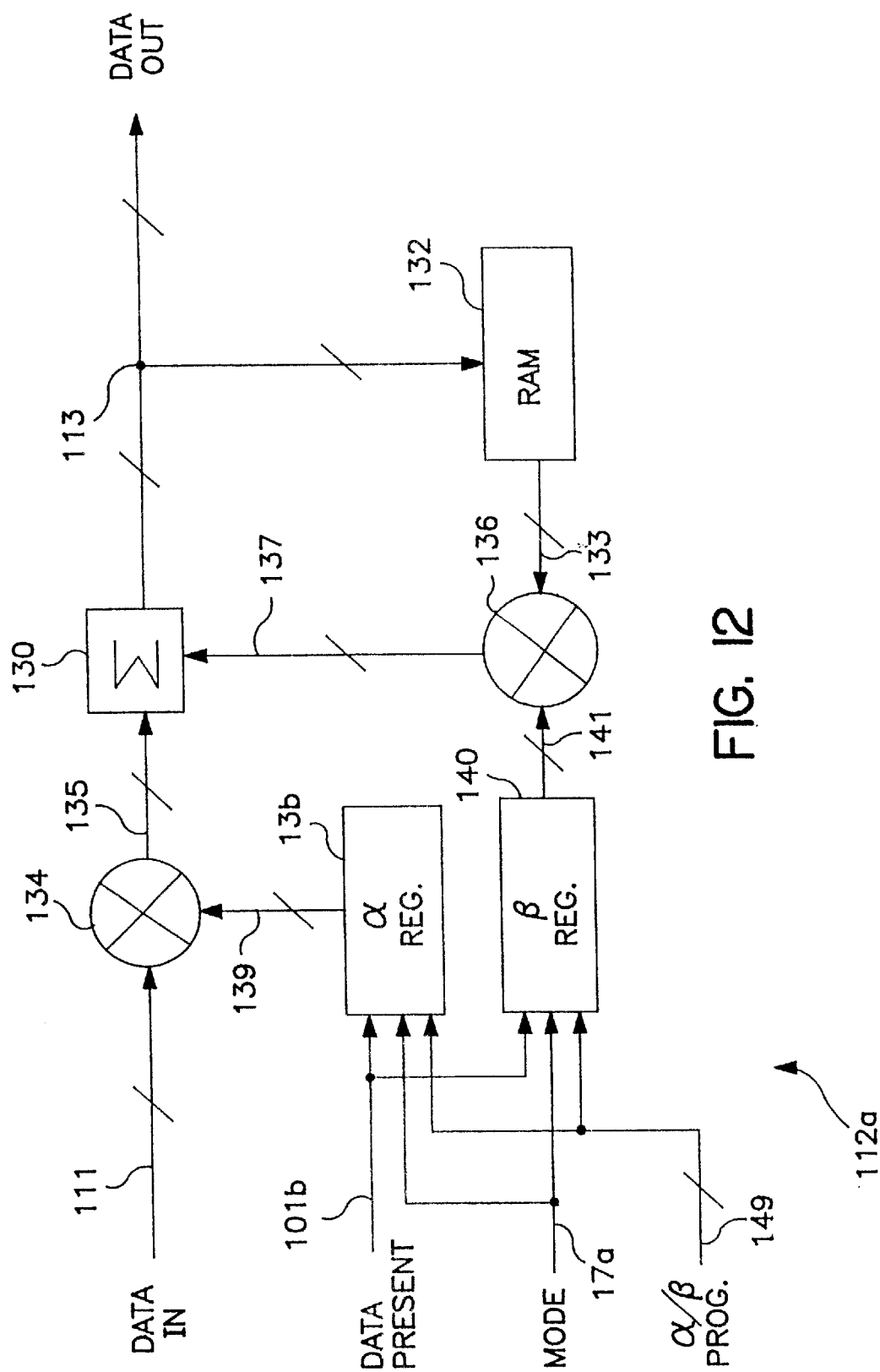
FIG. 12 is a functional block diagram of the data buffer stage of FIG. 8.
Figure 14:
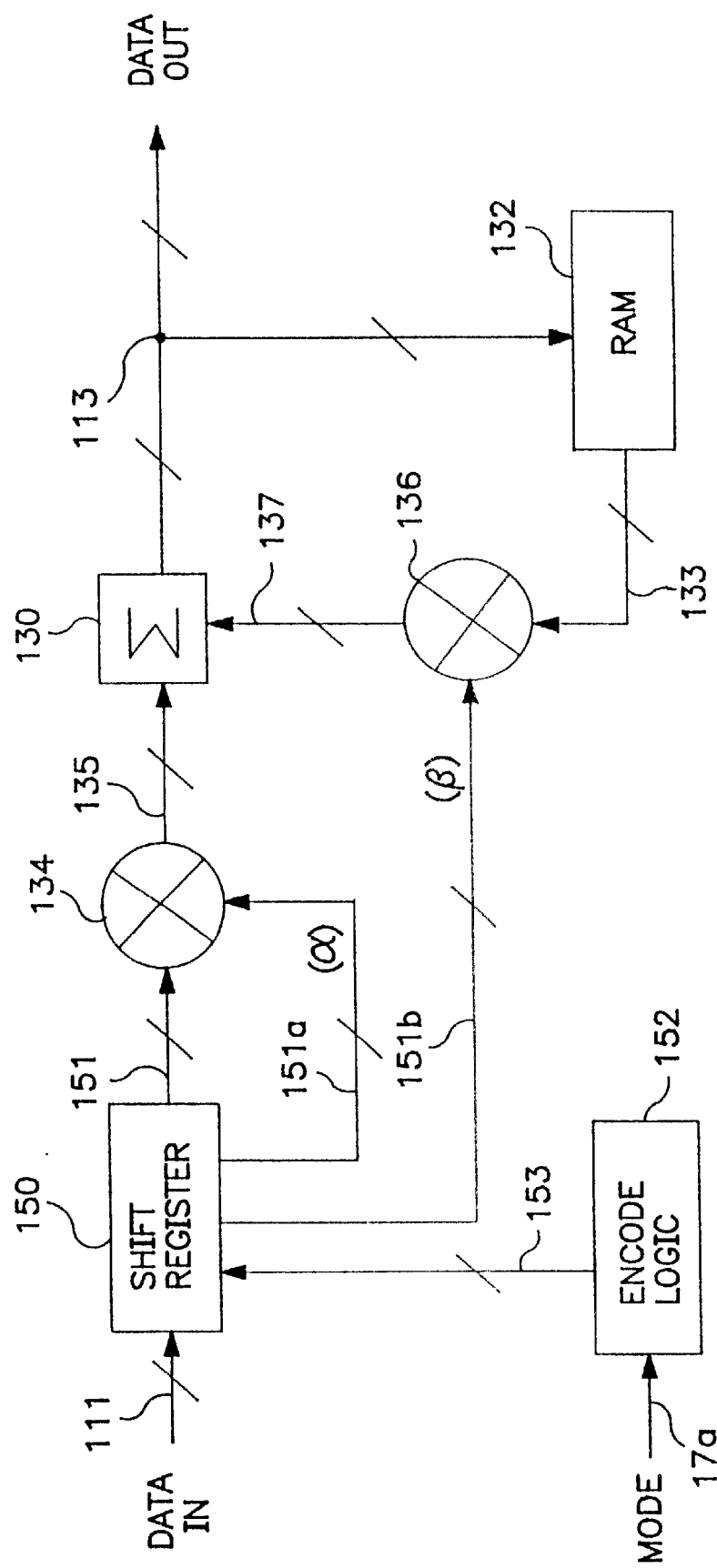
FIG. 14 is a functional block diagram of an alternative embodiment of the data buffer stage of FIG. 8.

Referring to FIG. 14, an alternative embodiment 112b of the data buffer/filter stage 112 can be implemented as shown. (Those elements which correspond to those in the embodiment 112a of FIG. 12 are identified with the same numeric designators.) This embodiment 112b can be used where the $\alpha$ and $\beta$ scaling factor data has been inserted or encoded in some manner within the incoming data stream 111. Accordingly, a shift register 150 can be used to buffer and delay the actual pixel data while the $\alpha$ data 151a and $\beta$ data 151b are removed and forwarded on to the scaling circuits 134, 136. An encode logic circuit 152 can be used to provide appropriate control signals 153, in accordance with the mode control signal 17a, to the shift register 150.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a data processing system for processing a serial stream of multiple bit data sets which represent an array of pixels corresponding to a two-dimensional image including correcting for defective pixels individually or in groups, comprising:

a first data processing circuit configured to receive and process together a plurality of successive sets of image data with a corresponding plurality of successive sets of correction data and in accordance therewith provide a plurality of successive sets of corrected image data, wherein said plurality of successive sets of image data represents a plurality of pixels corresponding to a two-dimensional image, said plurality of successive sets of correction data represents a plurality of correction factors, each one of said plurality of correction factors corresponds to a respective one of said plurality of pixels and each one of said plurality of successive sets of correction data includes a first data subset which indicates whether said respective one of said plurality of pixels is defective; and a first data selection circuit, coupled to said first data processing circuit, configured to receive and select between individual ones of said plurality of successive sets of corrected image data and individual ones of said corresponding plurality of successive sets of correction data and in accordance therewith provide a first plurality of successive sets of selected data, wherein an individual one of said first plurality of successive sets of selected data includes a corresponding individual one of said plurality of successive sets of correction data when said first data subset indicates that said corresponding respective one of said plurality of pixels is defective, and wherein said individual one of said first plurality of successive sets of selected data includes a corresponding one of said plurality of successive sets of corrected image data when said first data subset does not indicate that said corresponding respective one of said plurality of pixels is defective.

2. The apparatus of claim 1, wherein each one of said plurality of successive sets of correction data further includes a second data subset which indicates which one of a plurality of substitute pixel values is to be used for said defective corresponding respective one of said plurality of pixels, and further comprising:

a second data processing circuit, coupled to said first data selection circuit, configured to receive and store said first plurality of successive sets of selected data and generate a first set of substitute data, wherein said first set of substitute data represents a first one of said plurality of substitute pixel values and is computed in accordance with selected ones of said stored first plurality of successive sets of selected data; and a second data selection circuit, coupled to said second data processing circuit, configured to receive and select between one of said stored first plurality of successive sets of selected data and said first set of substitute data and in accordance therewith provide a second plurality of successive sets of selected data, wherein an individual one of said second plurality of successive sets of selected data includes said first set of substitute data when said second data subset indicates that said first one of said plurality of substitute pixel values is to be used for said defective corresponding respective one of said plurality of pixels, and wherein said individual one of said second plurality of successive sets of selected data includes said one of said stored first plurality of successive sets of selected data when said second data subset does not indicate that said first one of said plurality of substitute pixel values is to be used for said defective corresponding respective one of said plurality of pixels.

3. The apparatus of claim 2, wherein said second data processing circuit comprises:

a delay line configured to receive and store said first plurality of successive sets of selected data and in accordance therewith provide a plurality of successively delayed sets of selected data, wherein a temporally intermediate one of said plurality of successively delayed sets of selected data is provided as said one of said stored first plurality of successive sets of selected data; and a data averaging circuit, coupled to said delay line, configured to receive and average first and second ones of said plurality of successively delayed sets of selected data and in accordance therewith provide said first set of substitute data, wherein said first and second ones of said plurality of successively delayed sets of selected data are temporally precedent and subsequent to said temporally intermediate one of said plurality of successively delayed sets of selected data.

4. The apparatus of claim 2, further comprising:

a third data processing circuit, coupled to said second data selection circuit, configured to receive and store said second plurality of successive sets of selected data and generate a second set of substitute data, wherein said second set of substitute data represents a second one of said plurality of substitute pixel values and is computed in accordance with selected ones of said stored second plurality of successive sets of selected data; and a third data selection circuit, coupled to said third data processing circuit, configured to receive and select between one of said stored second plurality of successive sets of selected data and said second set of substitute data and in accordance therewith provide a third plurality of successive sets of selected data, wherein an individual one of said third plurality of successive sets of selected data includes said second set of substitute data when said second data subset indicates that said second one of said plurality of substitute pixel values is to be used for said defective corresponding respective one of said plurality of pixels, and wherein said individual one of said third plurality of successive sets of selected data includes said one of said stored second plurality of successive sets of selected data when said second data subset does not indicate that said second one of said plurality of substitute pixel values is to be used for said defective corresponding respective one of said plurality of pixels.

5. The apparatus of claim 1, further comprising a data storage circuit, coupled to said first data processing circuit and said first data selection circuit, configured to store and provide said corresponding plurality of successive sets of correction data.

6. A method of processing a serial stream of multiple bit data sets which represent an array of pixels corresponding to a two-dimensional image including correcting for defective pixels individually or in groups, comprising the steps of:

receiving and processing together a plurality of successive sets of image data with a corresponding plurality of successive sets of correction data and in accordance therewith generating a plurality of successive sets of corrected image data, wherein said plurality of successive sets of image data represents a plurality of pixels corresponding to a two-dimensional image, said plurality of successive sets of correction data represents a plurality of correction factors, each one of said plurality of correction factors corresponds to a respective one of said plurality of pixels and each one of said plurality of successive sets of correction data includes a first data subset which indicates whether said respective one of said plurality of pixels is defective; and receiving and selecting between individual ones of said plurality of successive sets of corrected image data and individual ones of said corresponding plurality of successive sets of correction data and in accordance therewith generating a first plurality of successive sets of selected data, wherein an individual one of said first plurality of successive sets of selected data includes a corresponding individual one of said plurality of successive sets of correction data when said first data subset indicates that said corresponding respective one of said plurality of pixels is defective, and wherein said individual one of said first plurality of successive sets of selected data includes a corresponding one of said plurality of successive sets of correct image data when said first data subset does not indicate that said corresponding respective one of said plurality of pixels is defective.

7. The method of claim 6, wherein each one of said plurality of successive sets of correction data further includes a second data subset which indicates which one of a plurality of substitute pixel values is to be used for said defective corresponding respective one of said plurality of pixels, and further comprising the steps of:

receiving and storing said first plurality of successive sets of selected data and generating a first set of substitute data, wherein said first set of substitute data represents a first one of said plurality of substitute pixel values and is computed in accordance with selected ones of said stored first plurality of successive sets of selected data; and receiving and selecting between one of said stored first plurality of successive sets of selected data and said first set of substitute data and in accordance therewith generating a second plurality of successive sets of selected data, wherein an individual one of said second plurality of successive sets of selected data includes said first set of substitute data when said second data subset indicates that said first one of said plurality of substitute pixel values is to be used for said defective corresponding respective one of said plurality of pixels, and wherein said individual one of said second plurality of successive sets of selected data includes said one of said stored first plurality of successive sets of selected data when said second data subset does not indicate that said first one of said plurality of substitute pixel values is to be used for said defective corresponding respective one of said plurality of pixels.

8. The method of claim 7, wherein said step of receiving and storing said first plurality of successive sets of selected data and generating a first set of substitute data comprises:

receiving and storing said first plurality of successive sets of selected data and in accordance therewith generating a plurality of successively delayed sets of selected data, wherein a temporally intermediate one of said plurality of successively delayed sets of selected data is outputted as said one of said stored first plurality of successive sets of selected data; and receiving and averaging first and second ones of said plurality of successively delayed sets of selected data and in accordance therewith generating said first set of substitute data, wherein said first and second ones of said plurality of successively delayed sets of selected data are temporally precedent and subsequent to said temporally intermediate one of said plurality of successively delayed sets of selected data.

9. The method of claim 7, further comprising the steps of:

receiving and storing said second plurality of successive sets of selected data and generating a second set of substitute data, wherein said second set of substitute data represents a second one of said plurality of substitute pixel values and is computed in accordance with selected ones of said stored second plurality of successive sets of selected data; and receiving and selecting between one of said stored second plurality of successive sets of selected data and said second set of substitute data and in accordance therewith generating a third plurality of successive sets of selected data, wherein an individual one of said third plurality of successive sets of selected data includes said second set of substitute data when said second data subset indicates that said second one of said plurality of substitute pixel values is to be used for said defective corresponding respective one of said plurality of pixels, and wherein said individual one of said third plurality of successive sets of selected data includes said one of said stored second plurality of successive sets of selected data when said second data subset does not indicate that said second one of said plurality of substitute pixel values is to be used for said defective corresponding respective one of said plurality of pixels.

* * * * *